United States Patent
Wahba et al.

(10) Patent No.: US 11,790,309 B1
(45) Date of Patent: Oct. 17, 2023

(54) COURIER DELIVERY SERVICE

(71) Applicant: Express Scripts Strategic Development, Inc., St. Louis, MO (US)

(72) Inventors: Ahmed Wahba, St. Louis, MO (US); Steven E. Williams, St. Charles, MO (US); Karl P. Wickizer, University City, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 225 days.

(21) Appl. No.: 17/117,712

(22) Filed: Dec. 10, 2020

(51) Int. Cl.
*G06Q 10/0832* (2023.01)
*G06Q 10/0833* (2023.01)
*G07C 9/00* (2020.01)

(52) U.S. Cl.
CPC ..... *G06Q 10/0832* (2013.01); *G06Q 10/0833* (2013.01); *G07C 9/00309* (2013.01); *G07C 9/00896* (2013.01); *G07C 2009/0092* (2013.01)

(58) Field of Classification Search
CPC ........... G06Q 10/0833; G06Q 10/0832; G06Q 10/083
See application file for complete search history.

(56) References Cited

U.S. PATENT DOCUMENTS

| | | | |
|---|---|---|---|
| 7,789,241 | B2 | 9/2010 | Boom Coburn |
| 9,349,233 | B2 | 5/2016 | Muecke |
| 9,488,484 | B2 | 11/2016 | Lord |
| 9,597,262 | B2 | 3/2017 | Morgan |
| 9,731,853 | B2 | 8/2017 | Akdogan |
| 9,898,638 | B2 | 2/2018 | Jones |
| 9,905,133 | B1 | 2/2018 | Kumar |
| 9,986,823 | B2 | 6/2018 | Winter |
| 10,106,283 | B2 | 10/2018 | Akdogan |
| 10,115,257 | B2 | 10/2018 | Abner |
| 10,137,047 | B1 | 11/2018 | Difrancesco |

(Continued)

OTHER PUBLICATIONS

Degeler, Andrii, "Autonomous six-wheeled delivery robots will appear in London next year," arstechnica.com, Dec. 22, 2015, Retrieved from https://arstechnica.com/information-technology/2015/12/autonomous-six-wheeled-delivery-robots-will-appear-in-london-next-year/ (Year: 2015).*

Primary Examiner — Rupangini Singh
Assistant Examiner — Bryan J Kirk
(74) Attorney, Agent, or Firm — Husch Blackwell LLP (57) ABSTRACT

Systems and methods herein describe receiving a transport request from a first device, transmitting the transport request to a second device, causing the second device to display a first instruction, determining that a current location of a securable container associated with the second device matches the first location, based on the determination, generating a first access code operable to access the securable container, and transmitting the first access code to a third device, receiving an indication that the securable container has been opened using the first access code, based on the indication, causing the second device to display a second instruction, determining that a subsequent location of the securable container matches the second location, based on the determination, generating a second access code and transmitting the second access code to the first device; and receiving a subsequent indication that the securable container has been opened using the second access code.

20 Claims, 8 Drawing Sheets

(56) References Cited

U.S. PATENT DOCUMENTS

| | | |
|---|---|---|
| 10,147,306 B2 | 12/2018 | Kinney |
| 10,163,177 B2 | 12/2018 | Farris |
| 10,181,152 B1 | 1/2019 | Rao |
| 10,210,475 B2 | 2/2019 | Pargoe |
| 10,228,695 B2 | 3/2019 | Rezvani |
| 10,517,287 B2 | 12/2019 | Burrell |
| 10,799,808 B2 | 10/2020 | Davis |
| 2014/0317005 A1* | 10/2014 | Balwani ............... B65D 81/38 705/317 |
| 2016/0033966 A1 | 2/2016 | Farris |
| 2016/0039553 A1 | 2/2016 | Akdogan |
| 2016/0039621 A1 | 2/2016 | Akdogan |
| 2016/0042151 A1 | 2/2016 | Akdogan |
| 2016/0144358 A1 | 5/2016 | Patel |
| 2017/0073085 A1 | 3/2017 | Tremblay |
| 2017/0185731 A1 | 6/2017 | Ranieri |
| 2017/0185734 A1 | 6/2017 | Ranieri |
| 2017/0205827 A1 | 7/2017 | Rezvani |
| 2017/0236193 A1* | 8/2017 | Zundel ............... G06Q 10/083 705/16 |
| 2017/0369167 A1 | 12/2017 | Meadow |
| 2018/0012176 A1 | 1/2018 | Mchale |
| 2018/0039752 A1 | 2/2018 | Subbarao |
| 2018/0096183 A1 | 4/2018 | Jones |
| 2018/0144639 A1 | 5/2018 | Kumar |
| 2018/0158551 A1 | 6/2018 | Bradley |
| 2018/0173866 A1 | 6/2018 | Williams |
| 2018/0268109 A1 | 9/2018 | Ramgir |
| 2018/0290764 A1 | 10/2018 | Mcmillian |
| 2018/0307550 A1 | 10/2018 | Parikh |
| 2018/0352988 A1 | 12/2018 | Ortiz |
| 2019/0023438 A1 | 1/2019 | Akdogan |
| 2019/0039751 A1 | 2/2019 | Janssen |
| 2019/0039819 A1 | 2/2019 | Tremblay |
| 2019/0043013 A1 | 2/2019 | Pargoe |
| 2019/0047515 A1* | 2/2019 | Ferguson ............... G06Q 50/12 |
| 2019/0073631 A1 | 3/2019 | Ferguson |
| 2019/0077506 A1 | 3/2019 | Shaw |
| 2019/0121989 A1 | 4/2019 | Mousseau |
| 2019/0135433 A1 | 5/2019 | Goovaerts |
| 2019/0180236 A1* | 6/2019 | Greenberger ........ G05D 1/0291 |
| 2019/0180400 A1 | 6/2019 | Farris |
| 2019/0180603 A1 | 6/2019 | Kinney |
| 2019/0204836 A1 | 7/2019 | Rezvani |
| 2020/0019925 A1* | 1/2020 | Tokhtabaev ............. B64D 9/00 |
| 2020/0027054 A1* | 1/2020 | Hall .................... G06Q 10/083 |
| 2022/0129829 A1* | 4/2022 | Pourteymour ..... G07C 9/00182 |

* cited by examiner

COURIER DELIVERY SERVICE

TECHNICAL FIELD

Embodiments herein generally relate to courier services. More specifically, but not by way of limitation, embodiments herein describe a system for initiating and tracking courier delivery of prescription medicines.

BACKGROUND

Mail order pharmacies provide a convenient and cost-effective option for patients to receive prescription drugs. For example, a mail order pharmacy may be capable of taking advantage of economies of scale, volume dispensing of prescription drugs, and centralized warehousing and shipping to reduce the cost of prescription drugs by patients of the mail order pharmacy. Some types of prescription drugs may have temperature-related storage and handling requirements in order to maintain the safety and efficacy of the drugs. Such drugs may typically by shipped from a mail order pharmacy to the patient, doctor, nurse, treatment facility, or the like using insulated and/or temperature-controlled shipping containers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments herein describe a courier delivery system for medications. The courier delivery system may receive a request from a patient for a medication delivery. The request may include a pickup location and a drop-off location. The request may be submitted to a delivery device associated with a delivery vehicle. The delivery vehicle may include a physical securable container for transporting the medication. The securable container may be located in the trunk of a delivery car, for example. The delivery vehicle may be provided with navigational instructions to the pickup location. In an example embodiment, the delivery vehicle may include a device electronically associated with the vehicle to provide delivery instructions related to a passenger, a package (e.g., a prescription drug), or both. The courier delivery system may determine that the delivery vehicle has arrived at the pickup location and transmits an access code to provider device associated with the pickup location. For examples, the provider device may be associated with a pharmacy. The pharmacy may acquire the medication and load the medication into the securable container using the access code. The delivery vehicle may proceed to the drop-off location. The courier delivery system may determine that the delivery vehicle has arrived at the drop-off location and transmits a second access code to the patient device. The patient uses the second access code to access the medication from the securable container.

The patient may not live near a pharmacy or other medication fulfillment center. The patient may not have a permanent home or office address to accept delivery of physical items. Thus, in some examples, the courier delivery system may be used to schedule a medication pickup from one or more stationary kiosk lockers. For example, the courier delivery system may receive a request from a patient for a medication pickup. The request may be submitted to the delivery device associated with the delivery vehicle. The delivery vehicle may pick up the prescription from the pharmacy as described above and may drop-off a securable container to a kiosk. The courier delivery system may notify the patient that the securable container has been dropped off in the kiosk locker and may further provide the patient with a first access code to access the kiosk locker and a second access code to open the securable container.

In some examples, the courier delivery system includes a communication portal between the patient and the provider. For example, the patient and the provider may be able establish a communication session (e.g., instant messaging, phone call, video call) to discuss important information regarding the medication.

In some examples, the courier delivery system further includes a payment subsystem. The payment subsystem may be used by the patient to pre-pay for the requested medication. In some examples the payment subsystem may access the patient's insurance information to determine the final payment of the requested medication.

Networked Computing Environment

Figure 1:
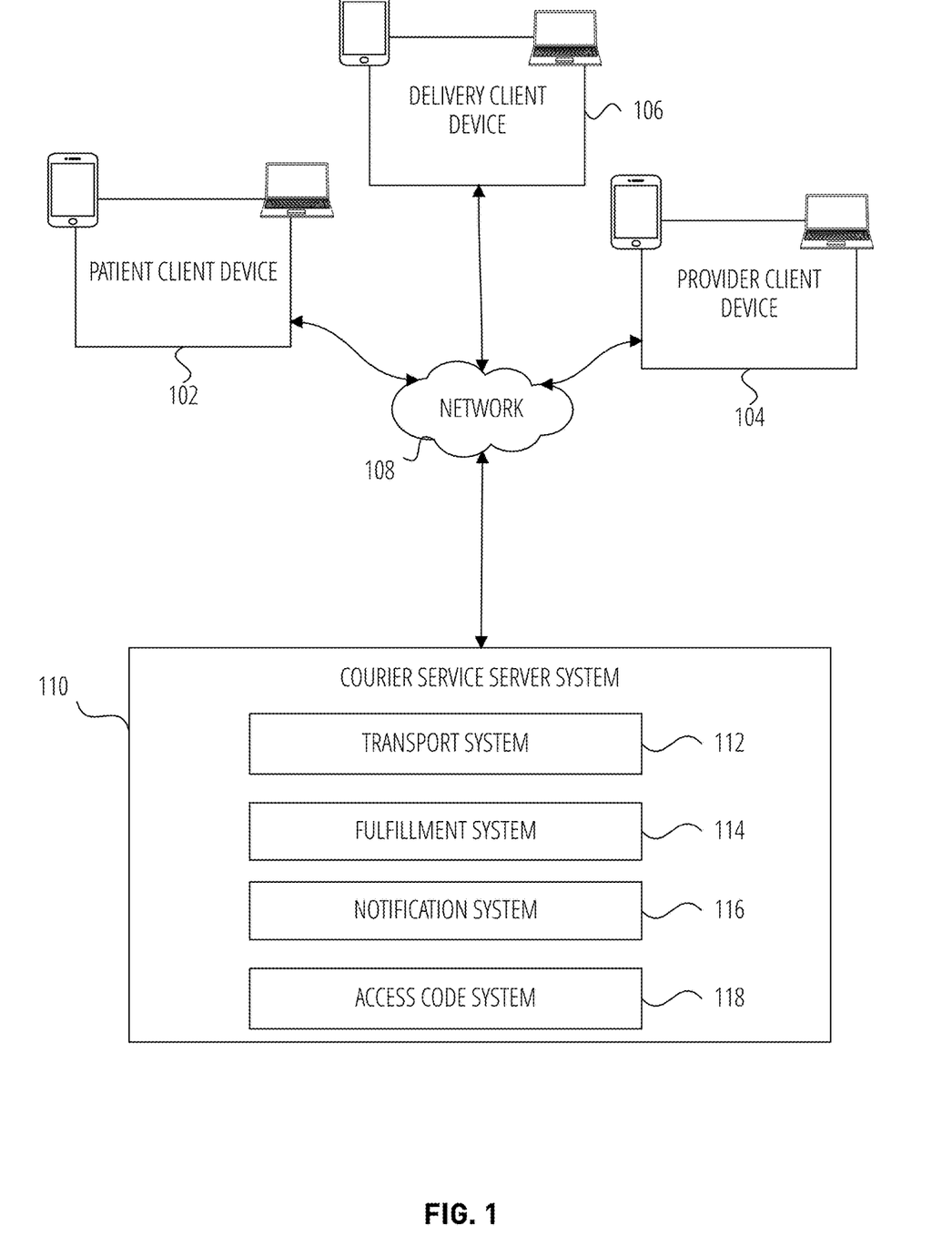
FIG. 1 is a block diagram showing an example system including a courier service server system according to various exemplary embodiments.

FIG. 1 is a block diagram showing an example system according to various exemplary embodiments. The system can be a customer service system that includes a courier service server system 110, a patient client device 102, a delivery client device 106, and a provider client device 104 that are communicatively coupled over a network 108 (e.g., Internet, telephony network, electronic communication network or the like).

The patient client device 102, delivery client device 106 and provider client device 104 can be communicatively coupled via an audio call (e.g., VoIP, Public Switched Telephone Network, cellular communication network, etc.) or via electronic messages (e.g., online chat, instant messaging, text messaging, email, and the like). In another embodiment, the patient client device 102, delivery client device 106 and provider client device 104 are communicatively coupled via a voice call, e.g., using a telephony network 108. While FIG. 1 illustrates a single patient client device 102, a single delivery client device 106 and a single provider client device 104, it is understood that a plurality of patient client devices 102, a plurality of delivery client devices 114 and a plurality of provider client devices 104 can be included in the system in other embodiments. As used herein, the term "client device" may refer to any machine that interfaces to a communications network (such as network 108) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The client device is a dedicated machine to store (at least temporarily) instructions that are executed on a processor for the functions and operations described herein. The client device can include a microphone and speaker on a mobile electronic device, a telephone, or a self-service kiosk, e.g., at a pharmacy, a clinic, a doctor's office, a mobile relief center, and the like. The client device can also include telecommunications devices for the deaf (TDD).

The network 108 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, Gobi™, Bluetooth™, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a patient user using the patient client device 102 can establish a communication session with a driver associated with the delivery client device 106 and a provider associated with the provider client device 104. The driver can be a human driver or an automated agent. The delivery client device 106 is associated with a delivery vehicle. The delivery client device 106 can be a wireless device with a display for displaying a variety of information, such as a user interface, which may include a menu, and a map showing the location of the vehicle associated with the delivery client device 106, a travel route for at least one of a passenger and a package. The delivery client device 106 may also include a controller for providing overall control of the device 106, a (wireless) transceiver to transmit (send) and receive signals, determination logic for making various determinations, and a default system for automatically invoking "default" operations with minimal or, in some cases, no user interaction. During a communication session between the patient, driver and provider, the courier service server system 110 identifies the member using initial context data (e.g., the phone number the member is calling from, member account information, name, address, insurance information, information on spouse and dependents, etc.) and initiates a transport request. The transport request may be a request by a patient for prescription or drug delivery.

The courier service server system 110 in FIG. 1 includes a transport system 112 and a notification system 116. The courier service server system 110 can further include elements described with respect to FIG. 7 and FIG. 8 such as a processor and memory, having instructions stored thereon, that when executed by the processor, causes the processor to control the functions of the courier service server system 110.

Figure 2:
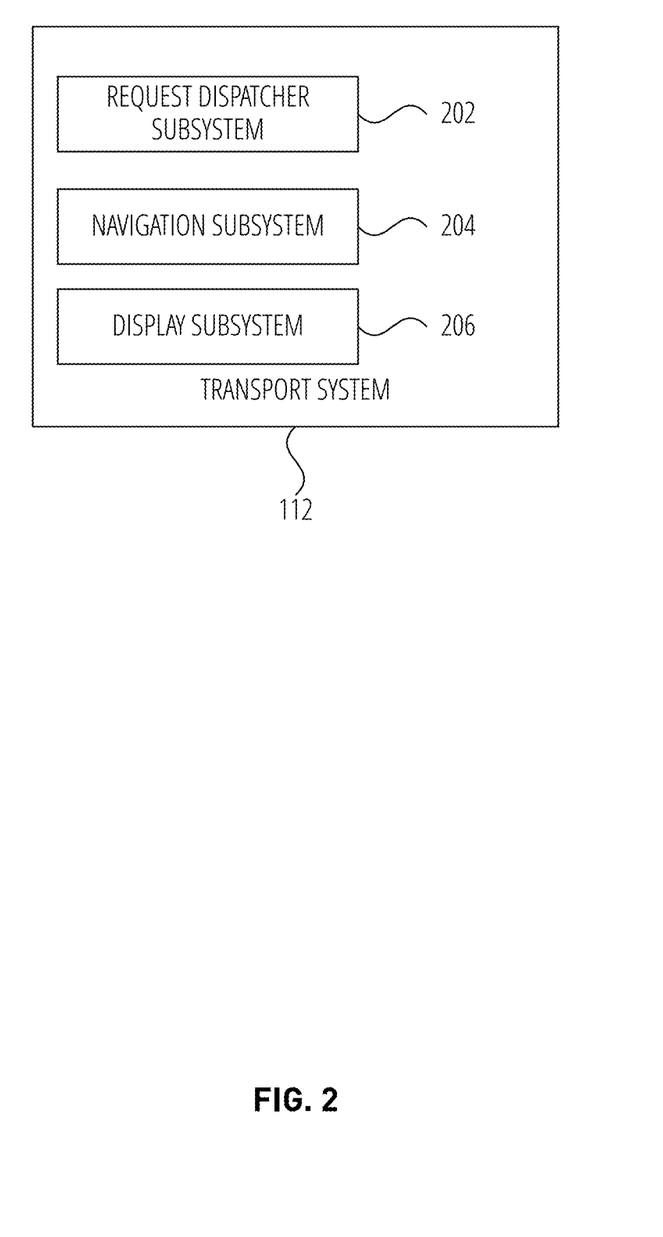
FIG. 2 is a block diagram of a transport system, according to example embodiments.

FIG. 2 is a block diagram of a transport system 112, according to example embodiments. Specifically, the transport system 112 is shown to comprise a request dispatcher subsystem 202, a navigation subsystem 204 and a display subsystem 206.

The transport system 112 receives requests from the patient client device 102 to initiate a transport trip. For example, a patient user who wishes to have their medication delivered to them may use the patient client device 102 to generate a transport request. In some examples, the transport request comprises a first location and a second location. The first location may be the location of a provider (e.g., a pharmacy) and the second location may be the location of the patient (e.g., home or office). The patient user may further specify a pickup time and drop-off time in the transport request. For example, the patient user may request that their prescription be picked up from their pharmacy (e.g., first location) by 10 AM and dropped off to the patient's home (e.g., second location) by 8 PM. In some examples, the patient user may indicate that they are flexible with the pickup and drop-off time. In the example that the patient user is flexible, the transport system 112 may optimize the route of the driver (e.g., user of the delivery client device 106) based on any additional transport requests associated with the driver, traffic data, or any other suitable information that may affect the pickup and drop-off times.

The patient user may submit the request from a graphical user interface of the patient client device 102. The patient user may select user interface elements (e.g., buttons, checkboxes, text fields, etc.) to indicate the first location, the pickup time, the second location, the drop-off time and whether or not they are flexible with the pickup time and/or drop-off time.

The request dispatcher subsystem 202 receives the request and selects a delivery vehicle to complete the request. The description below assumes that the delivery vehicle is a human operated automobile, but it is understood that the delivery vehicle may be any suitable delivery vehicle including but not limited to, autonomous vehicles, drones and bicycles. In some examples, the delivery vehicle is selected based on their current location and their proximity to the first location.

The delivery vehicle is equipped with a display subsystem 206 that displays instructions associated with the transport request on a graphical user interface of the delivery client device 106. For example, the display subsystem 206 may cause display of the first location, a pickup time associated with the first location, the second location, and a drop-off time associated with the second location.

The navigation subsystem 204 provides instructions for the delivery vehicle to navigate to the first location and subsequently to the second location. If the patient user indicates that they are flexible with the pickup and drop-off time, the delivery vehicle may navigate to various locations after navigating to the first location. If the patient indicates that the prescription must be picked up and dropped off within a short period of time, the delivery vehicle may be provided instructions to navigate to the first location and immediately after, to the second location.

In an example embodiment, the patient client device 104 may also include a display to show notification and location of the delivery vehicle, e.g., the delivery client device 106. The patient client device 104 can indicate what direction patient user needs to walk to approach a particular device, e.g., the delivery vehicle. As the patient client device 104 moves, the location relative to the delivery vehicle can change, e.g., items or icons on the display can be reordered display of the patient client device 104. Thus, the patient client device display may be continually updated using at least determination logic and proximity information.

Figure 3:
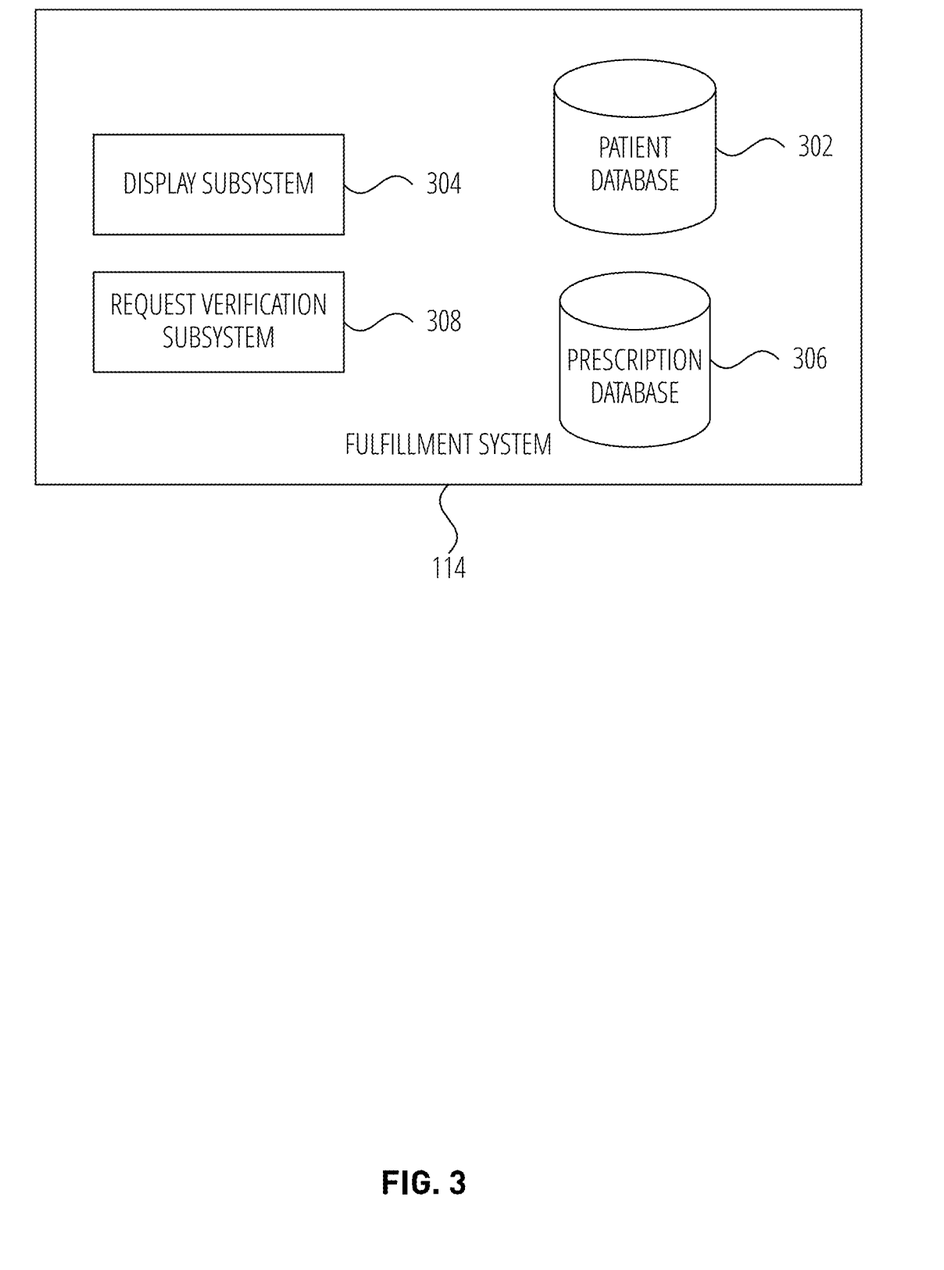
FIG. 3 is a block diagram of a fulfillment system, according to example embodiments.

FIG. 3 is a block diagram of a fulfillment system 114, according to example embodiments. Specifically, the fulfillment system 114 is shown to comprise a display subsystem 304, a request verification subsystem 308, a prescription database 306 and a patient database 302.

The fulfillment system 114 receives requests by a patient for a medication and prepares the medication for delivery. In some examples, the transport request further comprises a fulfillment request for a specific medication. While the navigational aspect of the transport request (e.g., first location, pickup time, second location, drop-off time) are received by the transport system 112, the portion of the request comprising medical information such as the specific medication required by the patient may be received by the fulfillment system 114. In some examples, the patient user using the patient client device 102 may submit a separate fulfillment request for the specific medication, and subsequently submit a transport request for the delivery of the specific medication.

The request verification subsystem 308 receives the request for a specific medication and verifies that the request is a valid request. A first verification process may comprise searching a patient database 302 and a prescription database 306 to verify that the patient has been prescribed the requested medication by qualified personnel. A second verification process may comprises contacting the patient and/or the prescriber of the medication to ensure that the request is a valid request. For example, the second verification process may require calling the patient's phone number to authenticate the patient's identity. It is to be understood that any suitable identity verification process may be used by the request verification subsystem 308. In some examples, the requested medication may have a limit on the frequency that it may be provided to the patient user. The request verification subsystem 308 may access historical data in the patient database 302 and the prescription database 306 to ensure that the requested medication may be provided to the patient user.

The fulfillment system 114 further comprises a display subsystem 206 that causes display on a graphical user interface of the provider client device 104 of information associated with the fulfillment request (e.g., patient identifiable information, medication information, etc.).

Figure 4:
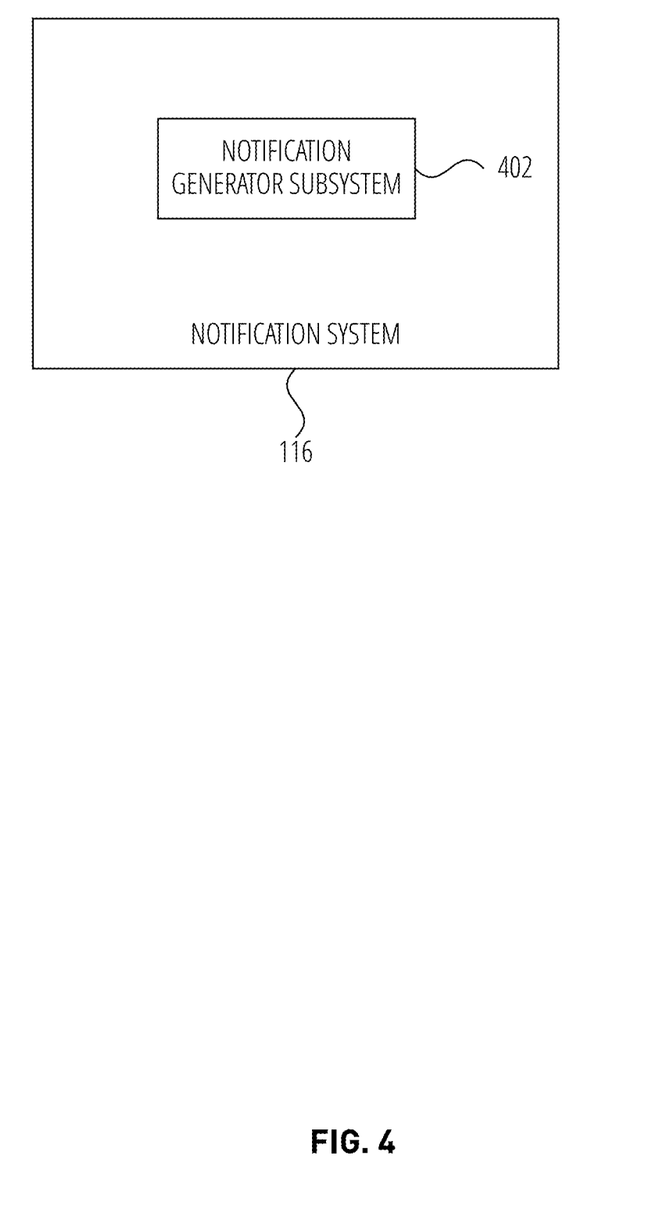
FIG. 4 is a block diagram of a notification system, according to example embodiments.

FIG. 4 is a block diagram of a notification system 116, according to example embodiments. Specifically, the notification system 116 is shown to comprise a notification generator subsystem 402.

The notification system 116 provides notification to the patient client device 102, delivery client device 106 and provider client device 104. For example, notifications may be generated by the notification generator subsystem 402. The notifications may provide updates or alerts to one or more of the patient client device 102, delivery client device 106 and provider client device 104.

Figure 5:
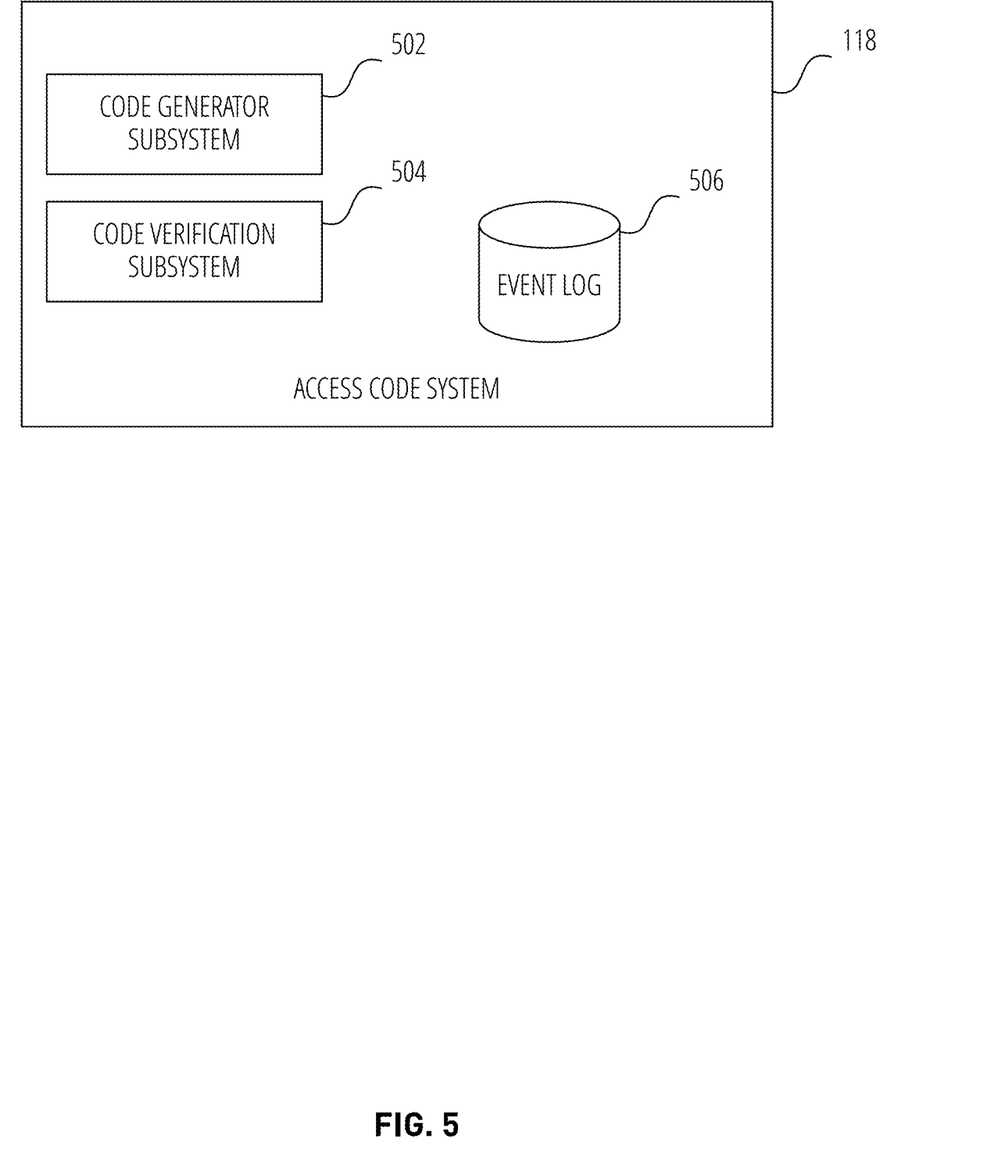
FIG. 5 is a block diagram of an access code system, according to example embodiments.

FIG. 5 is a block diagram of an access code system 118, according to example embodiments. Specifically, the access code system 118 is shown to comprise a code generator subsystem 502 and a code verification subsystem 504, and an event log 506.

The access code system 118 maintains secure access codes associated with the securable container. The code generator subsystem 502 generates secure access codes used to access the securable container. The secure access codes may comprise images, text, numbers, fingerprint information, eye scans or any suitable access codes. In some examples, the securable container comprises one or more of a keypads, a touch screen or camera that may be used to provide the secure access code. The code generator subsystem 502 transmits the generated secure access codes to the patient client device 102 or the provider client device 104.

The code verification subsystem 504 verifies that a secure access code used to access the securable container is a valid secure access code. In some examples, if an incorrect secure access code is used multiple times, consecutively, the code verification subsystem 504 may detect a malicious unauthorized access attempt and may temporarily disable the securable container from receiving further secure access codes for a predetermined amount of time. If the code verification subsystem 504 successfully verifies the secure access code, the code verification subsystem 504 unlocks the securable container.

Each generated secure access code and subsequent successful or unsuccessful use of the secure access code may be stored in the event log 506. The event log 506 may further store information regarding which client device (e.g., patient client device 102 or provider client device 104) received the generated secure access code.

Figure 6:
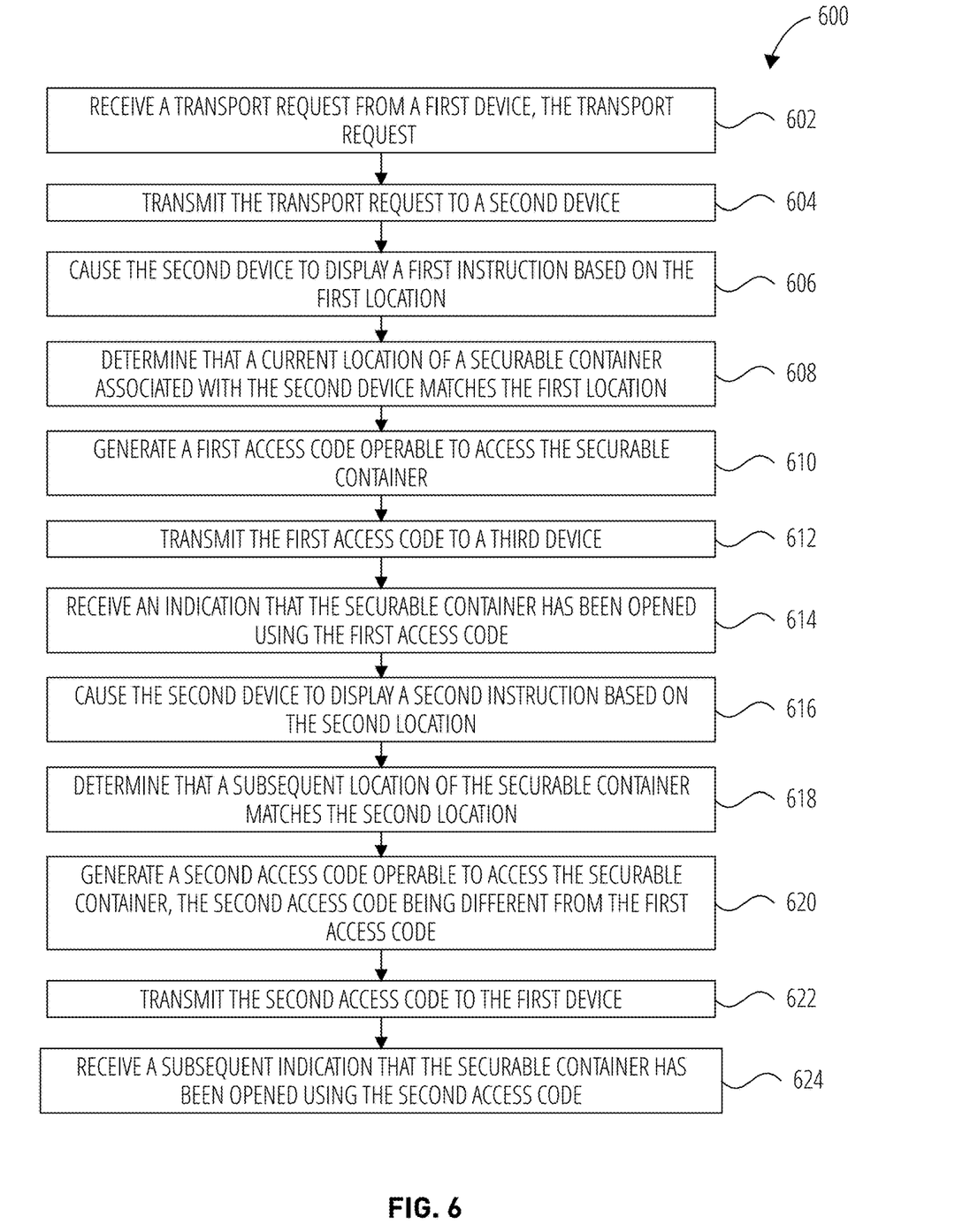
FIG. 6 illustrates a method for delivering medication using a courier delivery system, in accordance with one embodiment.

FIG. 6 is an example method for delivering medications using a courier service, according to some example embodiments. The method 600 can be performed by the courier service server system 110 in FIG. 1. In one embodiment, a processor (or circuitry dedicated to performing instructed tasks) included in the courier service server system 110 performs the method 600 or causes the courier service server system 110 to perform the method 600.

In operation 602, the courier service server system 110 receives, by a processor, a transport request from a first device. The first device may by the patient client device 102. The transport request comprises a first location and a second location. The first location may be a static location (e.g., a pharmacy). The second location may be a static location (e.g., a patient's home or office). In another example, the second location may be associated with the patient client device 102 and may be determined once the medication is ready for delivery.

The transport request may further comprise one or more medications for delivery. In some examples, the transport request is received by the transport system 112. In some examples, some portions of the transport request are received by the transport system 112 and some portions of the transport request are received by the fulfillment system 114.

In operation 604, the courier service server system 110 transmits the transport request to a second device. The second device may be the delivery client device 106. For examples, the request dispatcher subsystem 202 may transmit the transport request to the second device. In some examples, only the navigational aspects of the transport request are transmitted to the second device.

In operation 606, the courier service server system 110 causes the second device to display a first instruction based on the first location. The first instruction may be navigational instructions to navigate from a current location of the second device to the first location. The first instruction may be provided by the navigation subsystem 204.

In operation 608, the courier service server system 110 determines that a current location of a securable container associated with the second device matches the first location. For example, the courier service server system 110 may determine that the delivery vehicle has arrived at the first location. The current location of the securable container may be received by one or more sensors of the securable container or by one or more sensors of the second device. In some examples, the current location of the securable container may be received by one or more sensors of the delivery vehicle.

Based on the determination, in operation 610, the courier service server system 110 generates a first access code operable to access the securable container. The first access code may be generated by the code generator subsystem 502. In operation 612, the courier service server system 110 transmits the first access code to a third device. For examples, the first access code may be transmitted to the provider client device 104.

In operation 614, the courier service server system 110 receives an indication that the securable container has been opened using the first access code. The indication may be received by the code verification subsystem 504. Based on the indication, in operation 616, the courier service server system 110 causes the second device to display a second instruction based on the second location. For examples, the second device (e.g., delivery client device 106) may display a second instruction to navigate to the second location. The second instruction may be provided by the navigation subsystem 204.

In operation 618, the courier service server system 110 determines that a subsequent location of the securable container matches the second location. For example, the courier service server system 110 may determine that the delivery vehicle has arrived at the second location. The subsequent location of the securable container may be received by one or more sensors of the securable container or by one or more sensors of the second device. In some examples, the subsequent location of the securable container may be received by one or more sensors of the delivery vehicle.

Based on the determination, in operation 620, the courier service server system 110 generates a second access code operable to access the securable container. The second access code may be generated by the code generator subsystem 502. The second access code may be different from the first access code. In operation 622, the courier service server system 110 transmits the second access code to the first device. For example, the courier service server system 110 transmits the second access code to the patient client device 102. In operation 624, the courier service server system 110 receives a subsequent indication that the securable container has been opened using the second access code. The subsequent indication may be received by the code verification subsystem 504.

In some examples, the transport request may further comprise a pickup time and/or a drop-off time. If the transport request comprises a pickup time, the courier service server system 110 receives a current time associated with the first location. The current time may be received by one or more processors of the second device or the securable container. The courier service server system 110 determines that the current time matches the pickup time and generates the first access code based on the determination. If the transport request comprises a drop-off time, the courier service server system 110 receives a subsequent time associated with the second location. The subsequent time may be received by one or more processors of the second device or the securable container. The courier service server system 110 determines that the subsequent time matches the drop-off time and generates the second access code based on the determination.

The secure access codes (e.g., first access code and second access code) may be single use codes in order to prevent tampering of the contents within the securable container. In some examples, after operation 614, the courier service server system 110 deactivates the first access code to restrict subsequent access to the securable container using the first access code. In some examples, after operation 624, the courier service server system 110 deactivates the second access code to restrict subsequent access to the securable container using the second access code.

The patient user may select an option via the patient client device 102 to receive notifications from the courier service server system 110. The notifications may provide the patient user with updates on the status of their prescription delivery. In some examples, after or contemporaneously with operation 608, the courier service server system 110 generates a notification indicating that the delivery vehicle has arrived at the pharmacy. The notification may be generated by the notification system 116. The generated notification may be transmitted to the first device (e.g., the patient client device 102). In some examples, after or contemporaneously with operation 614, the courier service server system 110 (via the notification system 116) generates a notification indicating that the securable container has been opened and transmits the notification the first device. In some examples, the patient may be notified that the delivery vehicle is within one mile (or any other suitable distance) of the drop-off location (e.g., the second location).

In some examples the securable container is connected to a computer-network. For example, the securable container may have Wi-Fi or Bluetooth capabilities. The securable container may receive and transmit data (e.g., from the access code system 118) via the computer-network.

In some examples, the provider client device 104 is provided with multiple access codes from the access code system 118. For example, once the delivery vehicle arrives at the pharmacy, the provider client device 104 may receive a patient data access code. The patient data access code may be used to access patient data and prescription data relating to the patient. For example, the request verification subsystem 308 may require the patient data access code before providing any identifiable data about the patient. After the patient data access code is successfully submitted, the courier service server system 110 may subsequently transmit the first access code via the access code system 118. The first access code, as described above, may be used to access the securable container.

Software Architecture

Figure 7:
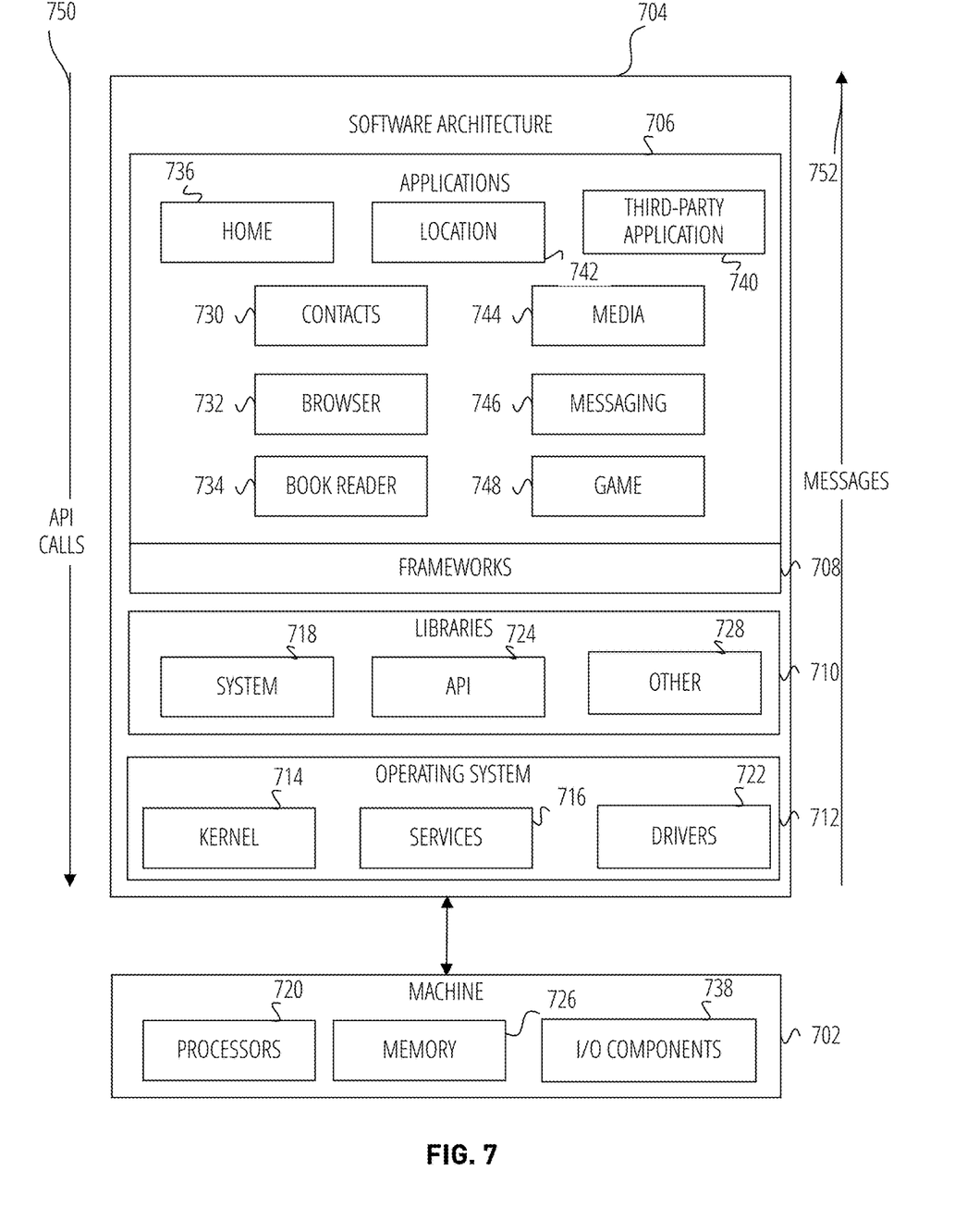
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Machine Architecture

Figure 8:
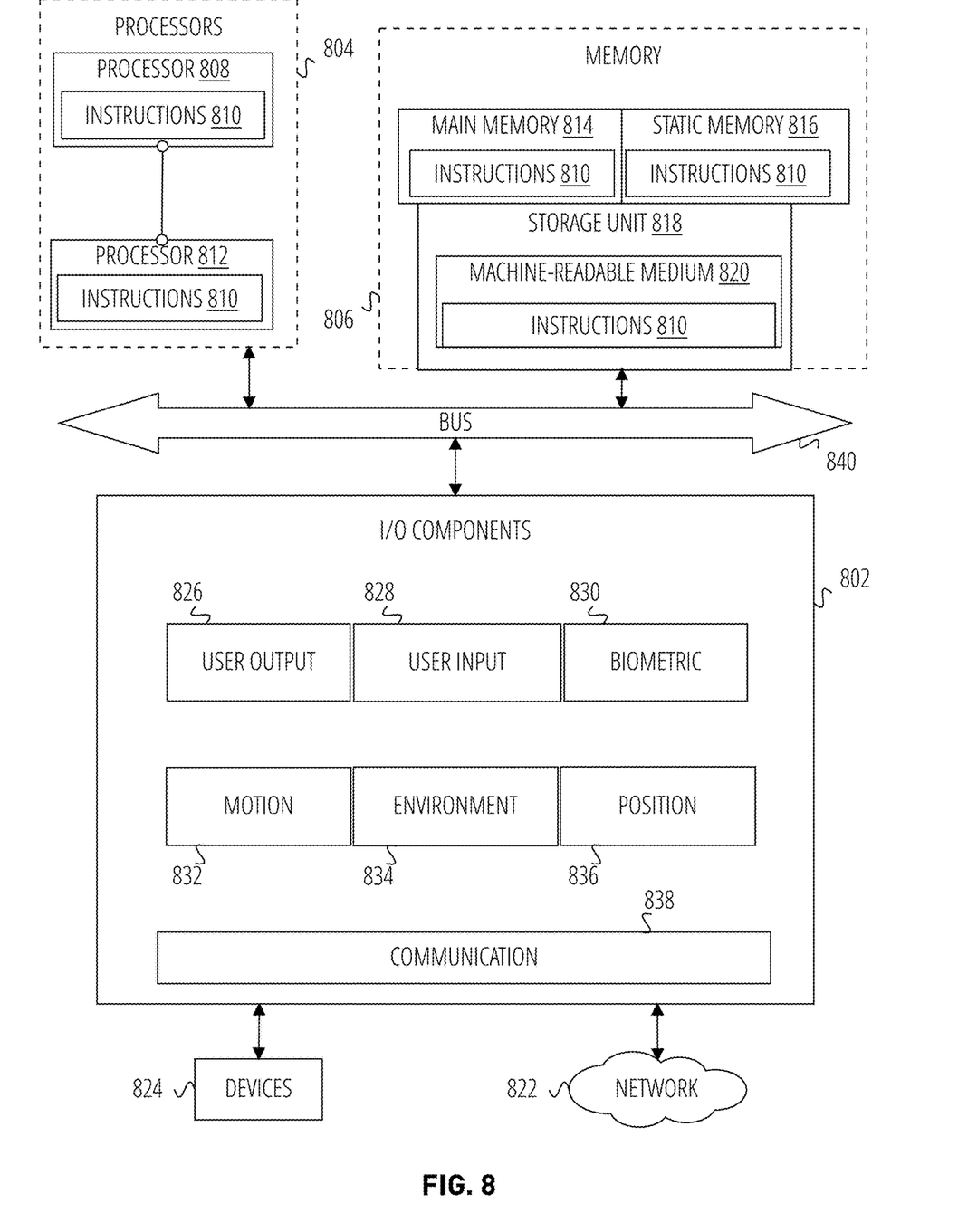
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the agent client device 102 or any one of a number of server devices in customer service server system 108. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

What is claimed is:

1. A method comprising:

receiving, by a processor, a transport request of a pharmaceutical from a first device, the transport request comprising a first location, a second location, and a drop-off time;

validating that the transport request by searching a patient database and a prescription database to ensure that a recipient associated with the transport request has been prescribed the pharmaceutical by qualified personnel, the step of validating that the transport request occurring in response to the receiving the transport request;

transmitting the transport request to a second device;

causing the second device to display a first instruction based on the first location;

determining that a current location of a mobile securable container associated with the second device matches the first location based on data transmitted by a location sensor associated with the mobile securable container or the second device;

based on the determination, generating a first access code operable to access the mobile securable container, and transmitting the first access code to a third device, wherein a pharmacy uses the first access code to access the mobile securable container, and wherein a code verification system unlocks the mobile securable container in response to successfully verifying that the pharmacy used the first access code;

receiving an indication that the mobile securable container has been opened using the first access code;

based on the indication, causing the second device to display a second instruction based on the second location;

determining that a subsequent location of the mobile securable container matches the second location based on data transmitted by the location sensor associated with the mobile securable container or the second device;

based on the determination, generating a second access code operable to access the mobile securable container, the second access code being different from the first access code, and transmitting the second access code to the first device, wherein the recipient uses the second access code to access the mobile securable container, and wherein the code verification system unlocks the mobile securable container in response to successfully verifying that the recipient used the second access code; and receiving a subsequent indication that the mobile securable container has been opened using the second access code;

receiving, by the processor, a subsequent time when the mobile securable container arrives at the second location;

determining that the subsequent time matches the drop-off time; and based on the determination, generating the second access code.

2. The method of claim 1, wherein the transport request further comprises a pickup time, the method further comprising:

receiving, by the processor, a current time associated with the first location;

determining that the current time matches the pickup time; and based on the determination, generating the first access code.

3. The method of claim 1, wherein after receiving the indication that the mobile securable container has been opened using the first access code, the method further comprising:

deactivating the first access code, the deactivation restricting access to the mobile securable container using the first access code.

4. The method of claim 1, wherein after receiving the subsequent indication that the mobile securable container has been opened using the second access code, the method further comprising:

deactivating the second access code, the deactivation restricting access to the mobile securable container using the second access code.

5. The method of claim 1, wherein receiving the indication that the mobile securable container has been opened using the first access code further comprises:

generating a notification indicating that the mobile securable container has been opened; and transmitting the notification to the first device.

6. The method of claim 1, wherein causing the second device to display the second instruction based on the second location further comprises:

generating a notification associated with the second instruction; and transmitting the notification to the first device.

7. The method of claim 1, wherein the mobile securable container is a computer-network connected securable container and is fixed in a vehicle.

8. A computing apparatus comprising:

a processor; and a memory storing instructions that, when executed by the processor, configure the apparatus to:

receive, by a processor, a transport request of a pharmaceutical from a first device, the transport request comprising a first location, a second location, and a drop-off time;

validating that the transport request by searching a patient database and a prescription database to ensure that a recipient associated with the transport request has been prescribed the pharmaceutical by qualified personnel, wherein the apparatus validating that the transport request in response to the receiving the transport request;

transmit the transport request to a second device;

cause the second device to display a first instruction based on the first location;

determine that a current location of a mobile securable container associated with the second device matches the first location based on data transmitted by a location sensor associated with the mobile securable container or the second device;

based on the determination, generate a first access code operable to access the mobile securable container, and transmit the first access code to a third device, wherein a pharmacy uses the first access code to access the mobile securable container, and wherein a code verification system unlocks the mobile securable container in response to successfully verifying that the pharmacy used the first access code;

receive an indication that the mobile securable container has been opened using the first access code;
based on the indication,
cause the second device to display a second instruction based on the second location;
determine that a subsequent location of the mobile securable container matches the second location based on data transmitted by the location sensor associated with the mobile securable container or the second device;
based on the determination,
generate a second access code operable to access the mobile securable container, the second access code being different from the first access code, and
transmit the second access code to the first device, wherein the recipient uses the second access code to access the mobile securable container, and wherein the code verification system unlocks the mobile securable container in response to successfully verifying that the recipient used the second access code;
receive a subsequent indication that the mobile securable container has been opened using the second access code,
receive, by the processor, a subsequent time when the mobile securable container arrives at the second location;
determine that the subsequent time matches the drop-off time; and
based on the determination, generate the second access code.

9. The computing apparatus of claim 8, wherein the transport request further comprises a pickup time, the method wherein the instructions further configure the apparatus to:
receive, by the processor, a current time associated with the first location;
determine that the current time matches the pickup time; and
based on the determination, generate the first access code.

10. The computing apparatus of claim 8, wherein after receiving the indication that the mobile securable container has been opened use the first access code, the method wherein the instructions further configure the apparatus to:
deactivate the first access code, the deactivation restricting access to the mobile securable container using the first access code.

11. The computing apparatus of claim 8, wherein after receiving the subsequent indication that the mobile securable container has been opened use the second access code, the method wherein the instructions further configure the apparatus to:
deactivate the second access code, the deactivation restricting access to the mobile securable container using the second access code.

12. The computing apparatus of claim 8, wherein receiving the indication that the mobile securable container has been opened use the first access code further comprises:
generate a notification indicating that the mobile securable container has been opened; and
transmit the notification to the first device.

13. The computing apparatus of claim 8, wherein causing the second device to display the second instruction based on the second location further comprises:
generate a notification associated with the second instruction; and
transmit the notification to the first device.

14. The computing apparatus of claim 8, wherein the mobile securable container is a computer-network connected securable container and is fixed in a vehicle.

15. A non-transitory computer-readable storage medium, the computer-readable storage medium including instructions that when executed by a computer, cause the computer to:
receive, by a processor, a transport request of a pharmaceutical from a first device, the transport request comprising a first location, a second location, and a drop-off time;
validating that the transport request by searching a patient database and a prescription database to ensure that a recipient associated with the transport request has been prescribed the pharmaceutical by qualified personnel, wherein the computer validating that the transport request in response to the receiving the transport request;
transmit the transport request to a second device;
cause the second device to display a first instruction based on the first location;
determine that a current location of a mobile securable container associated with the second device matches the first location based on data transmitted by a location sensor associated with the mobile securable container or the second device;
based on the determination,
generate a first access code operable to access the mobile securable container, and
transmit the first access code to a third device, wherein a pharmacy uses the first access code to access the mobile securable container, and wherein a code verification system unlocks the mobile securable container in response to successfully verifying that the pharmacy used the first access code;
receive an indication that the mobile securable container has been opened using the first access code;
based on the indication,
cause the second device to display a second instruction based on the second location;
determine that a subsequent location of the mobile securable container matches the second location based on data transmitted by the location sensor associated with the mobile securable container or the second device;
based on the determination,
generate a second access code operable to access the mobile securable container, the second access code being different from the first access code, and
transmit the second access code to the first device, wherein the recipient uses the second access code to access the mobile securable container, and wherein the code verification system unlocks the mobile securable container in response to successfully verifying that the recipient used the second access code;
receive a subsequent indication that the mobile securable container has been opened using the second access code,
receive, by the processor, a subsequent time when the mobile securable container arrives at the second location;
determine that the subsequent time matches the drop-off time; and
based on the determination, generate the second access code.

16. The computer-readable storage medium of claim 15, wherein the transport request further comprises a pickup time, the method wherein the instructions further configure the computer to:
    receive, by the processor, a current time associated with the first location;
    determine that the current time matches the pickup time; and
    based on the determination, generate the first access code.

17. The computer-readable storage medium of claim 15, wherein after receiving the indication that the mobile securable container has been opened use the first access code, the method wherein the instructions further configure the computer to:
    deactivate the first access code, the deactivation restricting access to the mobile securable container using the first access code.

18. The method of claim 1, wherein the mobile securable container stores the pharmaceutical therein.

19. The computer apparatus of claim 8, wherein the mobile securable container stores the pharmaceutical therein.

20. The computer-readable storage medium of claim 15, wherein the mobile securable container stores the pharmaceutical therein.

* * * * *